(12) United States Patent
Teranishi et al.

(10) Patent No.: US 8,519,992 B2
(45) Date of Patent: Aug. 27, 2013

(54) DISPLAY APPARATUS AND ELECTRONIC APPARATUS

(75) Inventors: Yasuyuki Teranishi, Kanagawa (JP); Yoshiharu Nakajima, Kanagawa (JP); Masafumi Matsui, Kanagawa (JP)

(73) Assignee: Japan Display West Inc., Aichi-Ken (JP)

( * ) Notice: Subject to any disclaimer, the term of this patent is extended or adjusted under 35 U.S.C. 154(b) by 1283 days.

(21) Appl. No.: 12/226,997

(22) PCT Filed: May 15, 2007

(86) PCT No.: PCT/JP2007/059925
§ 371 (c)(1),
(2), (4) Date: Nov. 4, 2008

(87) PCT Pub. No.: WO2007/132835
PCT Pub. Date: Nov. 22, 2007

(65) Prior Publication Data
US 2009/0231313 A1 Sep. 17, 2009

(30) Foreign Application Priority Data

May 15, 2006 (JP) ................................. 2006-134675
Apr. 25, 2007 (JP) ................................. 2007-115036

(51) Int. Cl.
*G09G 5/00* (2006.01)
(52) U.S. Cl.
USPC .............. 345/207; 345/76; 345/77; 345/102; 345/211; 345/690
(58) Field of Classification Search
USPC .................. 345/102, 207, 211–214, 690, 87, 345/89, 76
See application file for complete search history.

(56) References Cited

U.S. PATENT DOCUMENTS

| 6,479,940 B1 * | 11/2002 | Ishizuka ............... 315/169.3 |
| 7,268,337 B2 * | 9/2007 | Ozawa ................. 250/214 R |

(Continued)

FOREIGN PATENT DOCUMENTS

| JP | 03-012633 U | 1/1991 |
| JP | 03-249622 | 11/1991 |

(Continued)

OTHER PUBLICATIONS

International Search Report; International Application No. PCT/JP2007/059925; Dated: Jun. 6, 2007.

(Continued)

*Primary Examiner* — Quan-Zhen Wang
*Assistant Examiner* — Jennifer Nguyen
(74) *Attorney, Agent, or Firm* — Rader, Fishman & Grauer PLLC

(57) ABSTRACT

A display apparatus is provided which includes a display element section (2) for displaying an image in an image display region, a light detection sensor (3) for detecting the intensity of light in the image display region or in the proximity of the image display region using a thin film transistor formed on the same insulating substrate (1) as that of the display element section (2), and a light control circuit (5) for controlling the luminance when the display element section (2) displays an image based on a result of the detection by the light detection sensor (3).

Since the light intensity is detected by the light detection sensor (3) using the thin film transistor formed on the same insulating substrate (1) as that of the display element section (2), such a situation that the scale of the apparatus increases for light intensity detection can be prevented while good image display under various environments is made possible.

13 Claims, 18 Drawing Sheets

(56) References Cited

U.S. PATENT DOCUMENTS

| | | | |
|---|---|---|---|
| 8,334,861 B2 * | 12/2012 | Hashimoto | 345/207 |
| 2001/0055008 A1 | 12/2001 | Young et al. | |
| 2005/0067553 A1 | 3/2005 | Agari et al. | |
| 2005/0128171 A1 * | 6/2005 | Chen et al. | 345/87 |
| 2005/0184952 A1 * | 8/2005 | Konno et al. | 345/102 |
| 2005/0231457 A1 | 10/2005 | Yamamoto et al. | |
| 2006/0164408 A1 * | 7/2006 | Nishikawa et al. | 345/207 |
| 2007/0132749 A1 * | 6/2007 | Peng et al. | 345/207 |

FOREIGN PATENT DOCUMENTS

| | | |
|---|---|---|
| JP | 05-232450 | 9/1993 |
| JP | 05-232450 A | 9/1993 |
| JP | 07-253765 | 10/1995 |
| JP | 08-160917 A | 6/1996 |
| JP | 2000-122574 | 4/2000 |
| JP | 2001-296554 A | 10/2001 |
| JP | 2003-536114 | 12/2003 |
| JP | 2004-286971 | 10/2004 |
| JP | 2005-258403 | 9/2005 |
| JP | 2005-258404 | 9/2005 |
| JP | 2006-030318 | 2/2006 |
| WO | WO-03/050602 A1 | 6/2003 |

OTHER PUBLICATIONS

Japanese Office Action issued May 8, 2012 for corresponding Japanese Application No. 2007-115036.

* cited by examiner

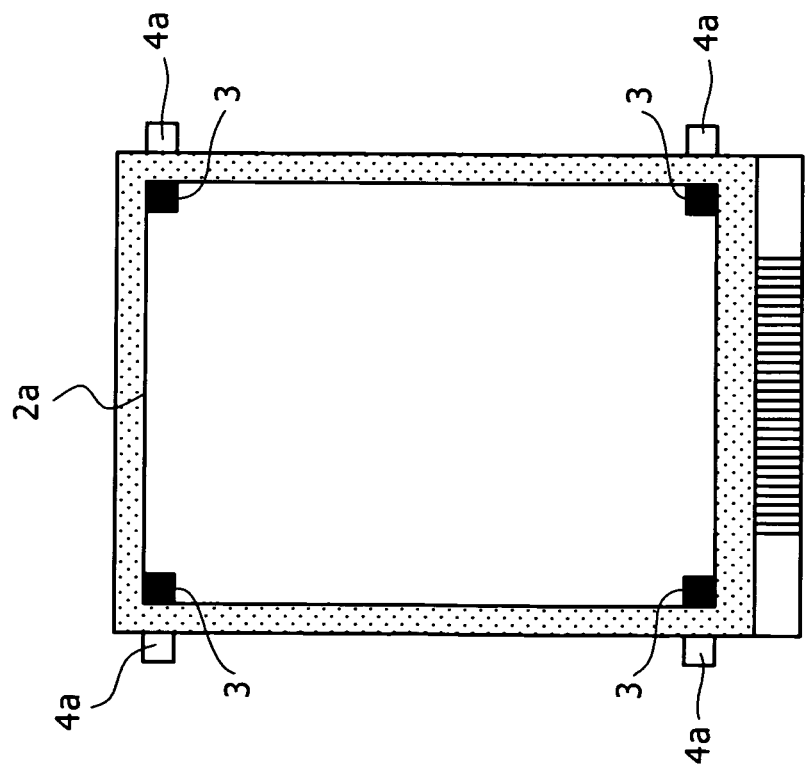
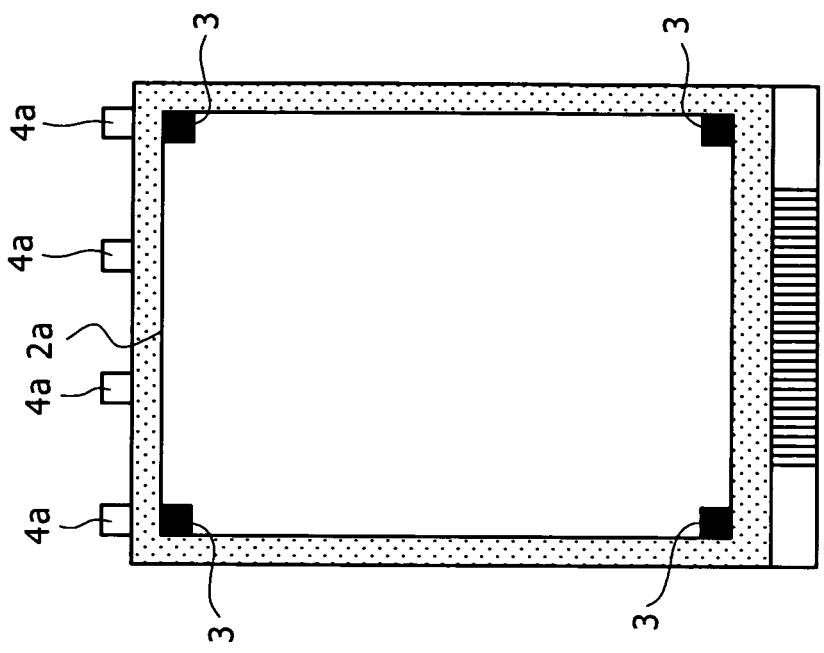

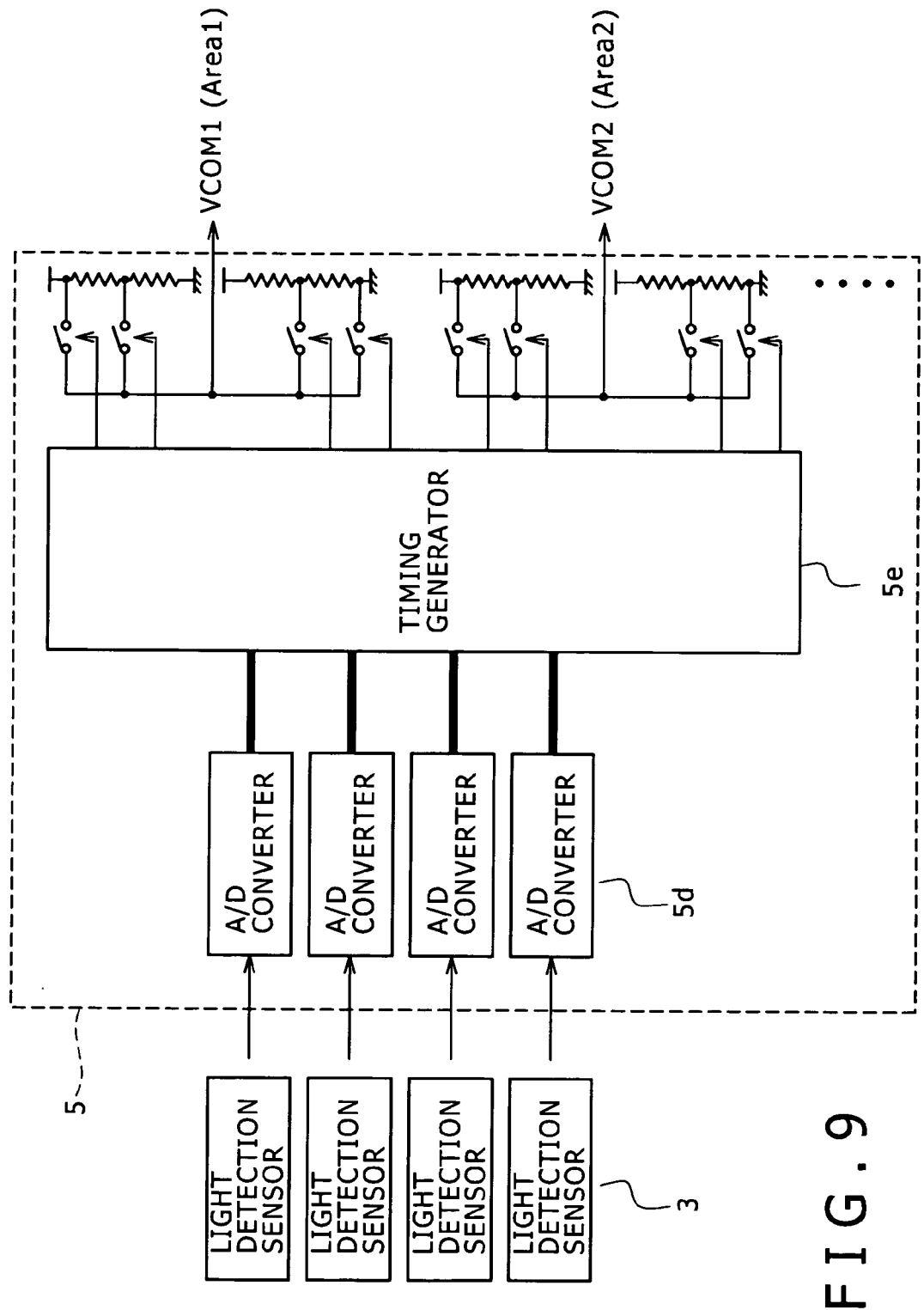
F I G. 9

DISPLAY APPARATUS AND ELECTRONIC APPARATUS

TECHNICAL FIELD

This invention relates to a display apparatus for displaying an image and an electronic apparatus which includes the display apparatus.

BACKGROUND ART

Generally, in electronic apparatus which are utilized as so-called mobile terminal apparatus such as portable telephone sets and personal digital assistants, a liquid crystal display panel, an organic EL (electroluminescence) panel or the like is used as a display apparatus. However, one of characteristics of mobile terminal apparatus is that they can be used under various environments (for example, outdoors). Accordingly, it is necessary for a display apparatus used in a mobile terminal apparatus to be capable of display a good image under various environments.

It is a possible idea to use, in order to be used under various environments, a display apparatus configured such that the brightness of a backlight for liquid crystal elements can be adjusted in response to a result of detection of the external light intensity (refer to, for example, Japanese Patent Laid-Open No. Hei or Japanese Patent Laid-Open No. 2000-294026). This is because the display apparatus of the type described can increase the brightness of the backlight under an environment in which the external light intensity is high such as outdoors, and suppress the brightness of the backlight under an environment wherein the external light intensity is low such as indoors.

DISCLOSURE OF INVENTION

Incidentally, one of significant characteristics of a mobile terminal apparatus is that it is small in size, light in weight and superior in portability. Accordingly, even if detection of the external light intensity makes it possible to display a good image under various environments, increase of the size of the display apparatus should be prevented.

Therefore, it is an object of the present invention to provide a display apparatus suitably used in a terminal apparatus which makes it possible to achieve good image display under various environments and, even in this case, can avoid increase of the size and so forth and which is small in size, light in weight and superior in portability and an electronic apparatus which includes the display apparatus.

The present invention provides a display apparatus invented to achieve the object described above, including image display means for displaying an image in an image display region, light detection means for detecting the intensity of light in the image display region or in the proximity of the image display region using a thin film transistor formed on the same substrate as that of the image display means, and light control means for controlling the luminance when the image display means displays an image based on a result of the detection by the light detection means.

With the display apparatus of the configuration described above, if the light intensity in the image display region or in the proximity of the image display region is detected by the light detection means, the light control means controls the luminance when the image display means displays an image based on a result of the detection. Accordingly, for example, such control that, where the light intensity is high, the luminance upon image display is increased, but where the light intensity is low, the luminance upon image display is suppressed can be implemented. Besides, even in such an instance as just described, the light detection means carries out the detection of the light intensity using the thin film transistor formed on the substrate same as that of the image display means. In other words, detection means separate from and independent of the image display means such as a photosensor is not required.

BRIEF DESCRIPTION OF DRAWINGS

FIG. 4 is an explanatory view showing examples of arrangement of light sources in the display apparatus according to the present invention.

FIG. 9 is an explanatory view showing a third example of the light control circuit which carries out luminance control by transmission light amount variation.

BEST MODE FOR CARRYING OUT THE INVENTION

In the following, a display apparatus and an electronic apparatus according to the present invention are described with reference to the drawings.

Figure 1:
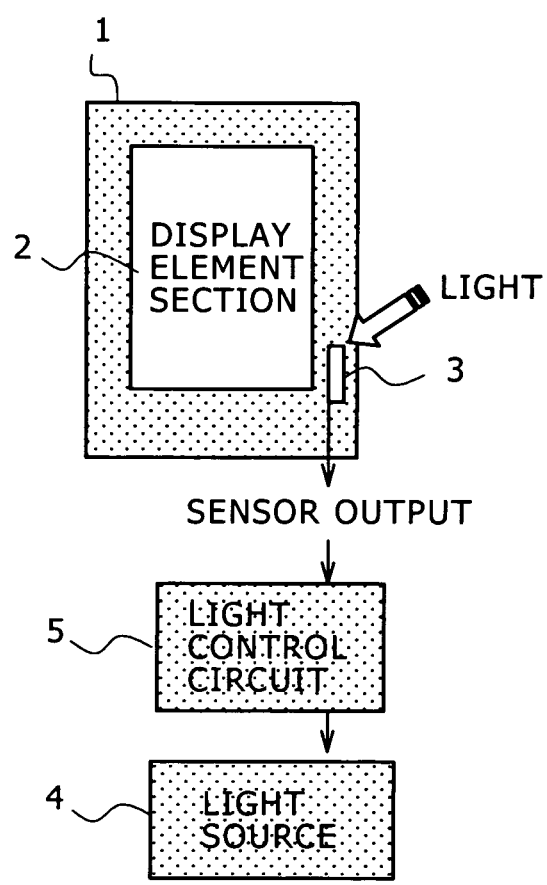
FIG. 1 is a block diagram showing an example of a general configuration of a display apparatus according to the present invention.

First, a general configuration of the display apparatus according to the present invention is described. FIG. 1 is a block diagram showing an example of a general configuration of the display apparatus according to the present invention. As in the example shown in the figure, the display apparatus described in the present embodiment is configured including, in addition to a display element section 2 and a light detection sensor 3 formed on an insulating substrate 1, a backlight or frontlight (hereinafter simply referred to as "light source") 4, and a light control circuit 5.

The display element section 2 is for displaying an image in an image display region and may be, for example, of the type wherein a plurality of liquid crystal display elements which selectively transmit or reflect light from the light source 4 are disposed in a matrix. However, the display element section 2 may be configured using display elements of the selfluminous type such as, for example, organic EL elements as long as it can display an image, and in this instance, the light source 4 is unnecessary.

Where the display element section 2 is formed from liquid crystal display elements, it is a possible idea to use, for example, a polycrystalline silicon (polysilicon) substrate as the insulating substrate 1 on which the display element section 2 is formed. This is because, if liquid crystal display elements are formed on a polysilicon substrate, then the display element section 2 constructs a function as so-called low-temperature polysilicon liquid crystal. In particular, this is because characteristics that, since polycrystalline silicon is more conductive compared to non-crystal (amorphous) silicon {HYPERLINK http://e-words.jp/w/E6B6B2E699B6.html, liquid crystal}, the reaction speed becomes higher and that, since also {HYPERLINK http://e-words.jp/w/E38388E383A9E383B3E382B8E382B9E382BF.html, transistor} for controlling the liquid crystal can be reduced in size, it is possible to raise the luminance by increasing the aperture area can be obtained. However, the insulating substrate 1 is not necessarily limited to a polysilicon substrate.

The light detection sensor 3 formed on the same substrate with a display element section 2 as described above is provided to detect the light intensity in the image display region of the display element section 2 or in the proximity of the image display region.

Figure 2A:
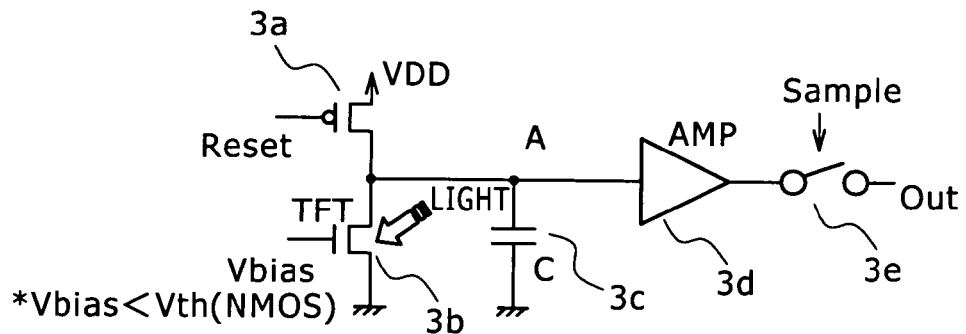
FIG. 2 is an explanatory view showing an example of a configuration of a light detection sensor in the display apparatus according to the present invention.
Figure 2B:
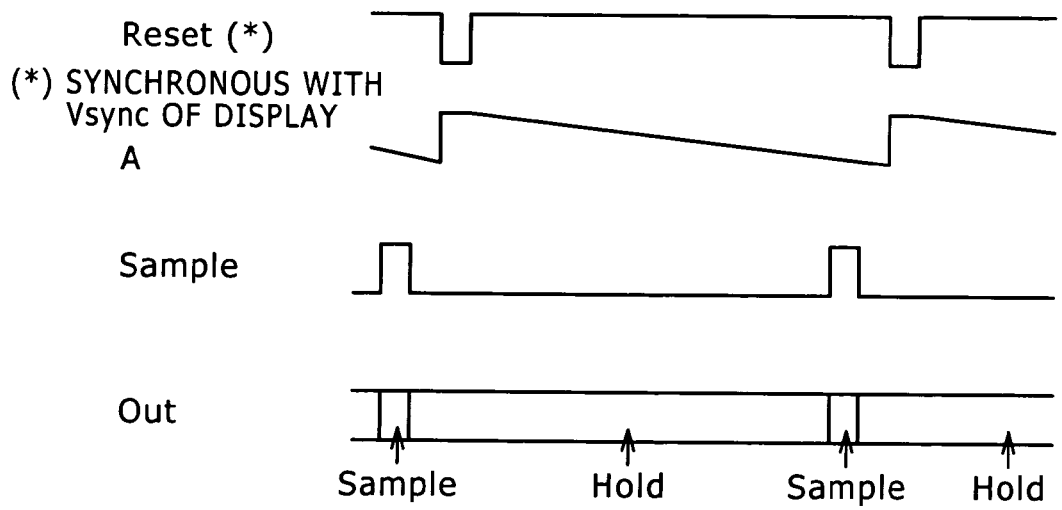
Figure 2C:
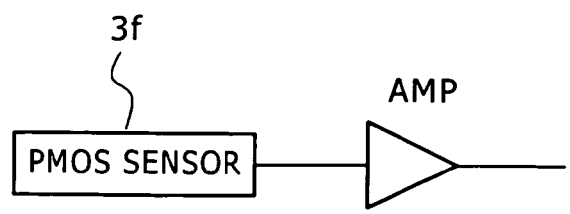
Figure 3A:
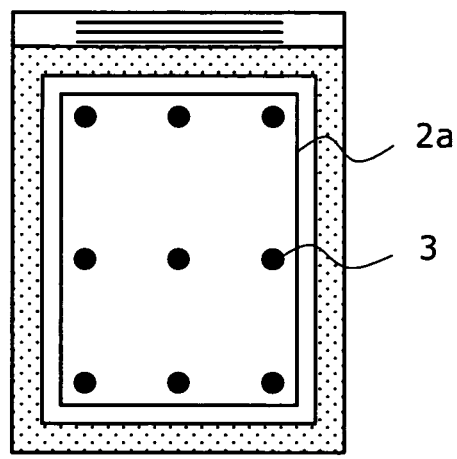
FIG. 3 is an explanatory view showing examples of arrangement of light detection sensors in the display apparatus according to the present invention.
Figure 3B:
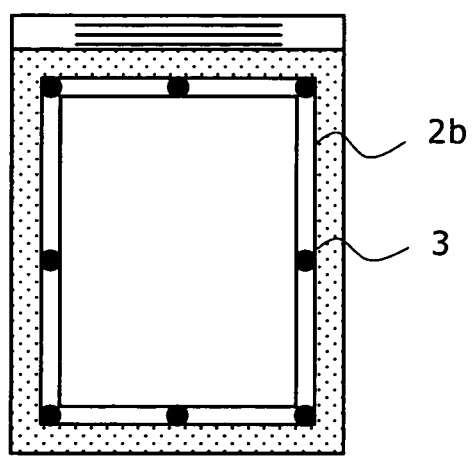
Figure 3C:
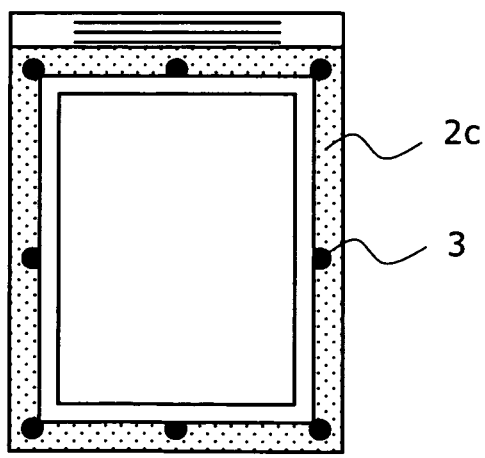

Here, the light detection sensor 3 is described in more detail. FIG. 2 is an explanatory view showing an example of a configuration of the light detection sensor, and FIG. 3 is an explanatory view illustrating examples of arrangement of such light detection sensors.

As shown in (a) of FIG. 2, the light detection sensor 3 includes a sensor transistor (hereinafter, the term transistor is abbreviated as "Tr") 3a, a reset Tr 3b, a capacitor 3c, an amplifier 3d and a readout switch 3e formed on the low-temperature polysilicon substrate. As shown in (b) of FIG. 2, the light detection sensor 3 is configured so as to function as a photoelectric conversion device which detects the light intensity by resetting the reset Tr 3b to discharge the charge of the capacitor 3c to establish an initial state, charging leak current of the sensor Tr 3a, which varies in response to the amount of received light, into the capacitor 3c, impedance-converting the voltage of the capacitor 3c by the amount of the charge by means of the amplifier 3d, and turning ON the readout switch 3e after a certain period of time to read out the sensor output to a signal line.

In this manner, the light detection sensor 3 detects the light intensity using a thin film transistor such as the sensor Tr 3a formed on the low-temperature polysilicon substrate. Accordingly, there is no necessity to prepare detection means such as a photo-sensor separate from and independent of the insulating substrate 1 on which the display element section 2 is formed. Further, since the formation process of the sensor Tr 3a and so forth can be carried out continuously to the formation process of the display element section 2, the configuration of the light detection sensor 3 is preferable also from the point of view of enhancement of efficiency of the fabrication process. However, the light detection sensor 3 need not necessarily be formed using the sensor Tr 3a or the like, and if it can be formed on the insulating substrate 1, then the light detection sensor 3 may be formed so as to detect the light intensity using a PMOS sensor 3f as shown in (c) of FIG. 2.

Meanwhile, the light detection sensor 3 detects the light intensity of external light to the image display region. However, the light detection sensor 3 may be formed so as to detect not the light intensity of external light but the light intensity of light obtained from the image display region, that is, the light intensity of light after it is irradiated from the light source 4 and then transmitted through or reflected by the display element section 2.

Furthermore, the light detection sensor 3 is disposed on the low-temperature polysilicon substrate such that it detects the light intensity at a plurality of points in the image display region of the display element section 2 or in the proximity of the image display region. In particular, it is a possible idea to dispose the light detection sensor 3 at a plurality of points inside the image display region 2a as shown in (a) of FIG. 3, to dispose the light detection sensor 3 at a plurality of points in the inside of a no-image display region (for example, a white border zone equal to two pixels) 2b around the image display region 2a as shown in (b) of FIG. 3 or to dispose the light detection sensor 3 at a plurality of points in a portion called frame portion 2c of the so-called display screen outside the image display region 2a as shown in (c) of FIG. 3. It is to be noted that the points of arrangement and the number of points of arrangement of the light detection sensors 3 are not limited particularly, but may be set suitably, for example, in response to the size, resolution and so forth of the image display region 2a. However, preferably the barycenter of the plurality points at which the light detection sensor 3 is disposed coincides with the center of the image display region 2a. This is because to carry out multiple-point detection of the light intensity has substantially same significance as to measure the area (image display region 2a) to be detected actually and this gives rise to enhancement of the reliability of detection data.

Further, in FIG. 1, the light source 4 irradiates light on the display element section 2 in order to display an image on the display element section 2. For the light irradiation, the light source 4 may be configured using, for example, a light emitting diode (Light Emitting Diode: hereinafter simply referred to as "LED"). This is because, if an LED is used, then it becomes very easy to cope with reduction in scale, reduction in weight and so forth.

Here, a configuration of this light source 4, more specifically, arrangement of LEDs which form the light source 4, is described briefly. FIG. 4 is an explanatory view showing examples of arrangement of the light source. The light source 4 may be configured using a plurality of LEDs 4a as in the example of the figure. This is because, where the plurality of LEDs 4a are used, the in-plane uniformity of irradiation light on the image display region 2a can be obtained easily. This means that each of the LEDs 4a irradiates light only on part of the image display region 2a partial region in the image display region 2a, that is, each LED 4a irradiates light on each divisional region obtained by dividing the image display region 2a into a plurality of regions. It is to be noted that the number of such LEDs 4a to be arranged is not limited particularly, but may be set suitably, for example, in response to the size of the image display region 2a. This similarly applies to the arrangement points of the LED 4a. That is, light guide plate or the like for introducing light from the LEDs 4a into the respective divisional regions is used, then the LEDs 4a may be disposed uniformly in the LED 4a as shown in (a) of FIG. 4 or may be disposed one-sidedly to part of the image display region 2a as shown in (b) of FIG. 4.

Further, in FIG. 1, the light control circuit 5 controls the luminance when the display element section 2 displays an image based on a result of detection of the light intensity by the light detection sensor 3, that is, based on sensor outputs from the readout switch 3e. In particular, the light control circuit 5 variably adjusts the luminance upon image display in response to a result of detection by the light detection sensor 3.

It is a possible idea to carry out the variation adjustment of the luminance by varying the light emission luminance of the light source 4.

Figure 5:
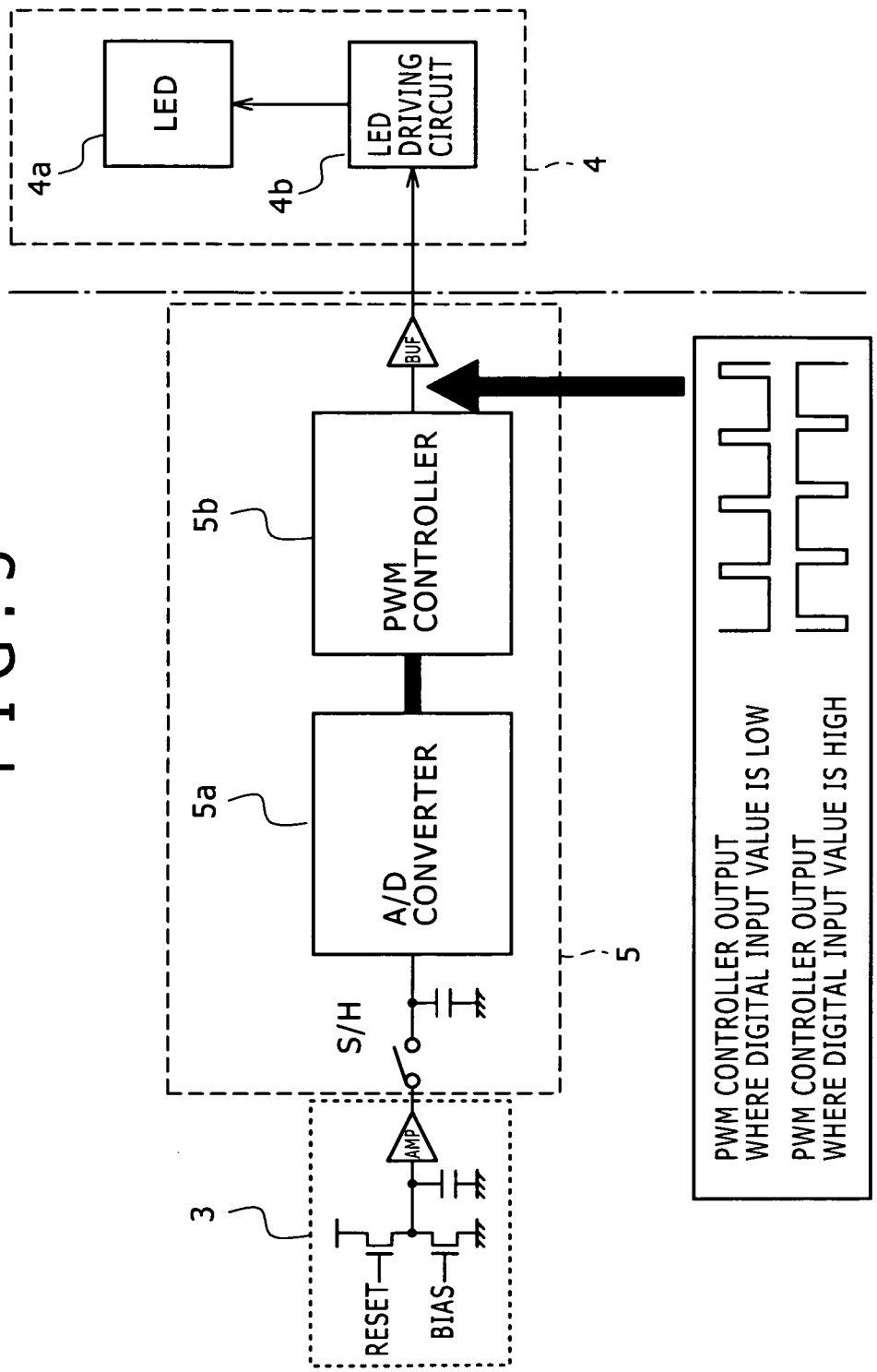
FIG. 5 is an explanatory view showing an example of a configuration of a light control circuit which carries out luminance control by light emission intensity variation.

FIG. 5 is an explanatory view showing an example of a configuration of a light control circuit for carrying out luminance control by light emission intensity variation. As in the example of the figure, the light control circuit 5 is configured such that, when the luminance control is carried out by light emission intensity variation, an analog output from the light detection sensor 3 is converted into a digital value by an A/D converter 5a and the duty of the digital value is changed by a PWM (Pulse Width Modulation) controller 5b such that it is outputted as a PWM signal. If the PWM signal is inputted to a driving circuit 4b for an LED 4a serving as the light source 4, then the light emission intensity of the LED 4a can be adjusted. In particular, it is a possible idea to shorten the Hi period of the PWM signal when the input digital value to the PWM controller 5b is low but elongate the Hi period of the PWM signal when the input digital value is high. However, also it is possible to adopt a reverse configuration.

Figure 6:
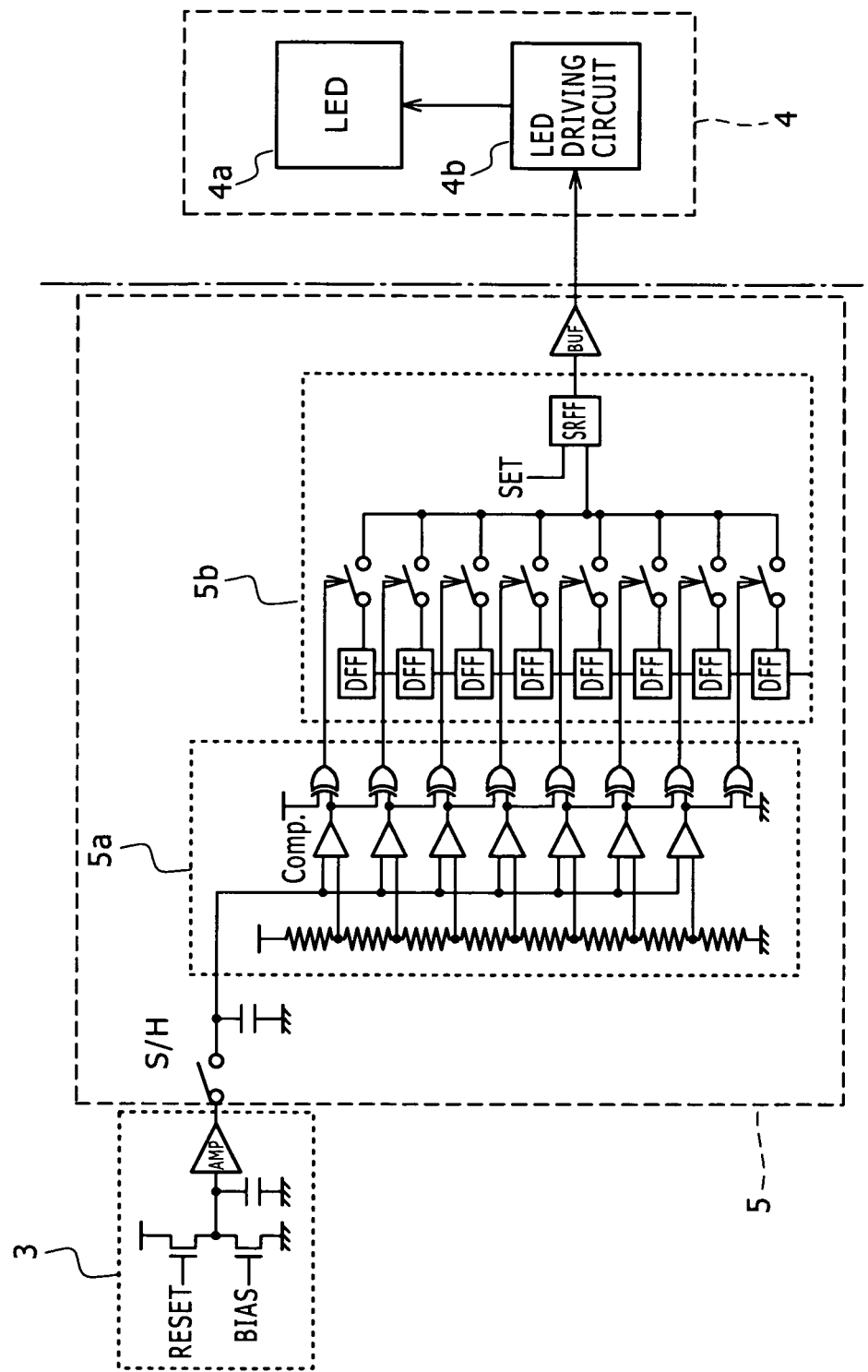
FIG. 6 is an explanatory view showing another example of the configuration of the light control circuit which carries out luminance control by light emission intensity variation.

FIG. 6 is an explanatory view showing another example of a configuration of the light control circuit. Even with such an analog configuration as in the example of the figure, the light control circuit 5 can adjust the light emission intensity of the LED 4a. Further, in such an analog configuration as shown in the example of the figure, since an encoding operation of the A/D converter 5a and a decoding operation in the PWM controller 5b are omitted, the light control circuit 5 contributes also to reduction in space, reduction in power consumption and so forth.

Further, the variation adjustment of luminance can be carried out not by varying the light emission intensity of the light source 4 but by varying the transmission light amount of light from the light source 4 through the display element section 2. Such variation of the transmission light amount is particularly effective in a case wherein adjustment of the light emission intensity of the LED 4a is difficult. The variation adjustment of the transmission light amount may be carried out using one of three configurations described below.

Figure 7:
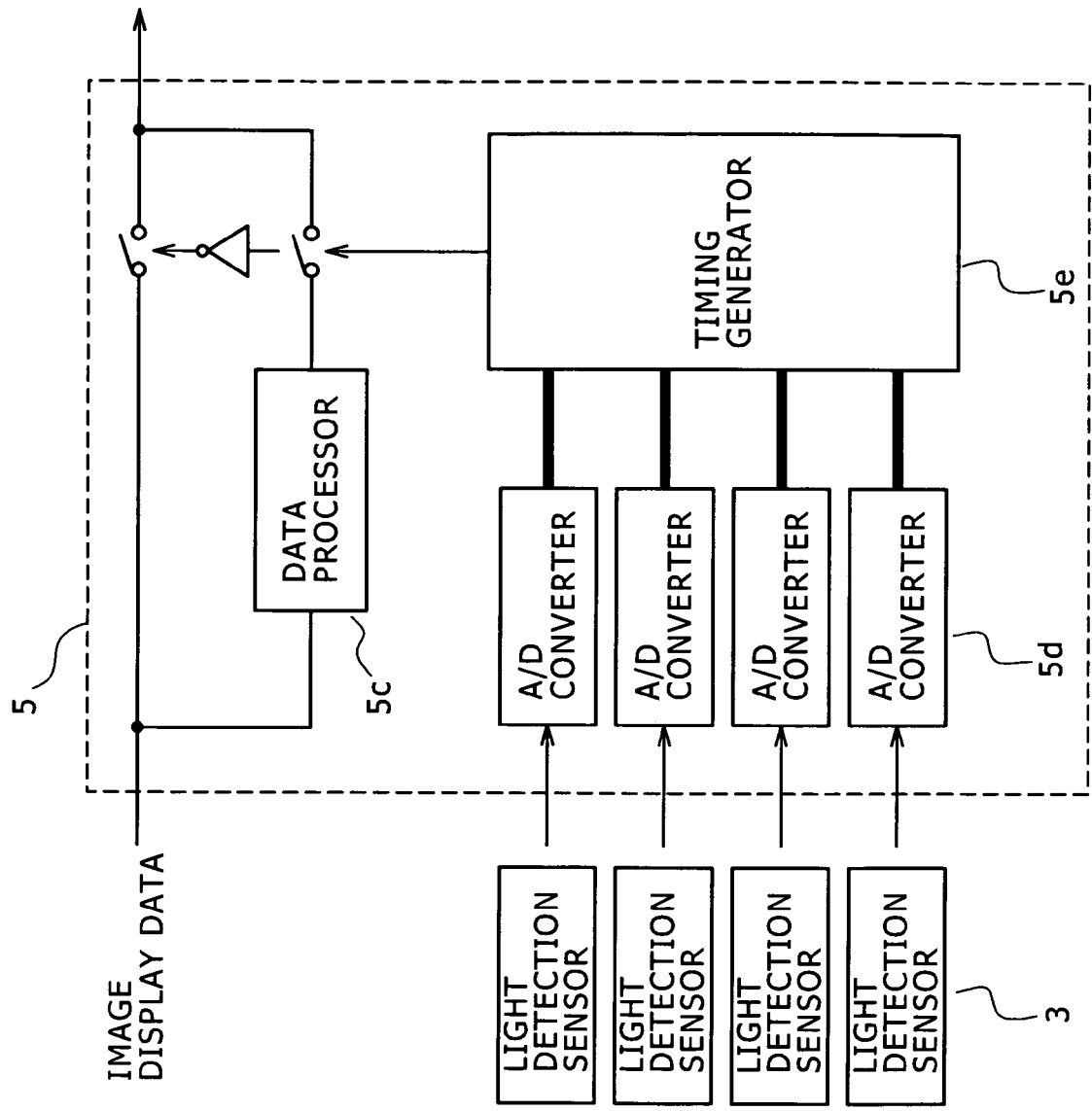
FIG. 7 is an explanatory view showing a first example of the light control circuit which carries out luminance control by transmission light amount variation.

FIG. 7 is an explanatory view showing the first example of the light control circuit which carries out luminance control by transmission light amount variation. The light control circuit 5 of the example of the figure applies, to image display data based on which the display element section 2 displays an image, a digital mathematic operation process by which the transmission light amount by the display element section 2 is varied so as to variably adjust the luminance when the display element section 2 displays an image. In particular, the light control circuit 5 is configured such that a route which passes a data processor 5c by which the a digital mathematic operation process is applied to image display data and another route which does not pass the data processor 5c are prepared, and an output from the light detection sensor 3 is converted into a digital value by a A/D converter 5d and the two routes are switched at a timing specified by a timing generator 5e in response to the digital value after the conversion so that image display data may pass one of the routes.

Figure 8:
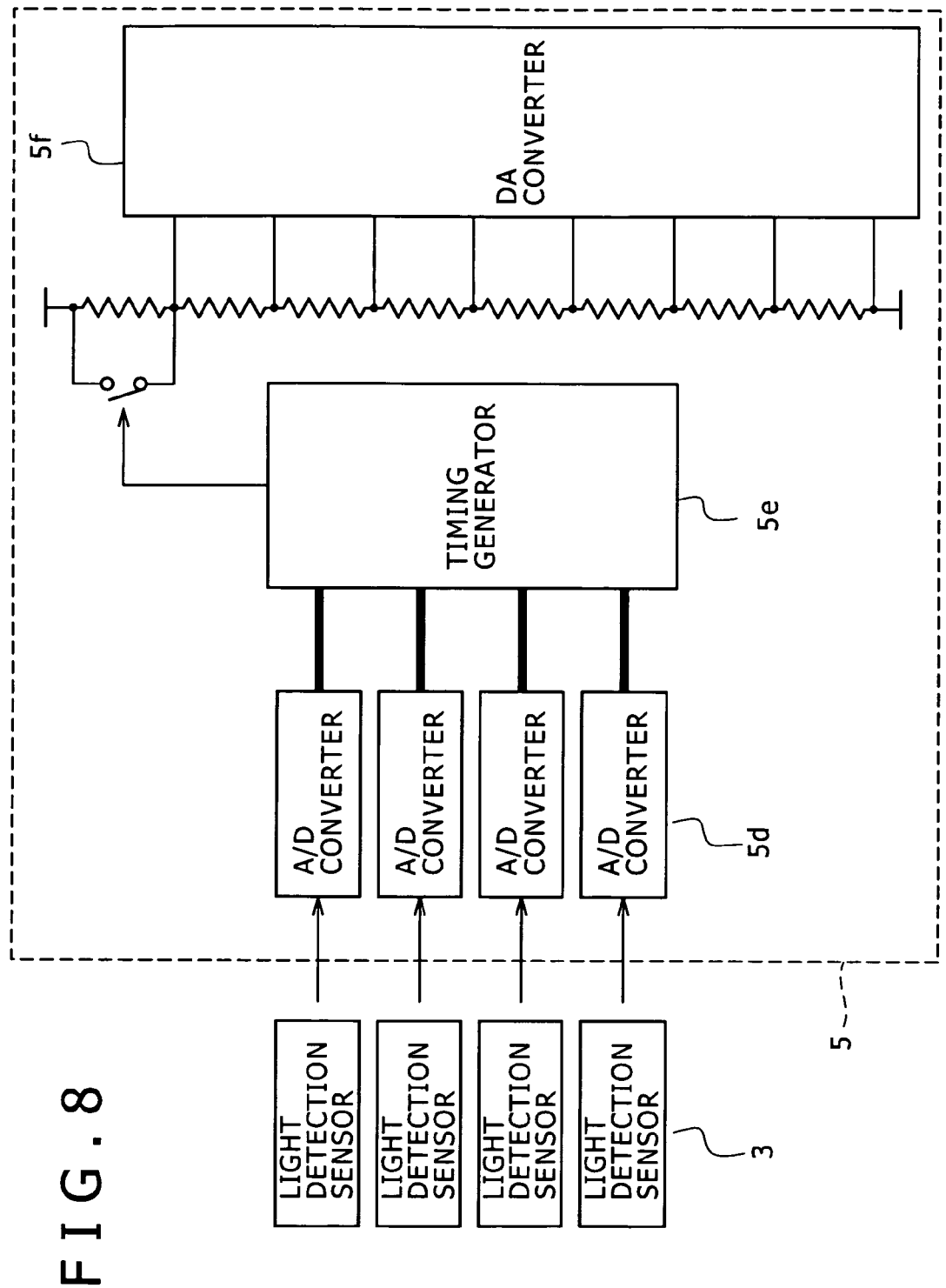
FIG. 8 is an explanatory view showing a second example of the light control circuit which carries out luminance control by transmission light amount variation.

FIG. 8 is an explanatory view showing the second example of the light control circuit which carries out luminance control by transmission light amount variation. The light control circuit 5 of the example of the figure variably adjusts the luminance when the display element section 2 displays an image by carrying out such a signal process that vary the reference voltage when image display data based on which an image is to be displayed are provided to the display element section 2 thereby to relatively vary the transmission light amount of the display element section 2. In particular, the light control circuit 5 is configured such that an output of the light detection sensor 3 is converted into a digital value by the A/D converter 5d and then the value of the reference voltage to be applied to a D/A converter 5f which carries out D/A conversion for providing image display data to the display element section 2 is changed over at a timing specified by the timing generator 5e in response to the digital value after the conversion.

FIG. 9 is an explanatory view showing the third example of the light control circuit which carries out luminance control by transmission light amount variation. The light control circuit 5 of the example shown in the figure carries out such a signal process that vary the amplitude of a VCOM (opposing electrode voltage) of the display element section 2 when an image is displayed and the transmission light amount of the display element section 2 is relatively varied thereby to variably adjust the luminance when an image is displayed on the display element section 2. In particular, the light control circuit 5 is configured such that an output from the light detection sensor 3 is converted into a digital value by the A/D converter 5d and the VCOM to be provided to the display element section 2 is changed over at a timing specified by the timing generator 5e in response to the digital value after the conversion.

Incidentally, as described hereinabove, the light detection sensor 3 detects the light intensity at a plurality of points. In particular, the light control circuit 5 receives a plurality of sensor outputs from the light detection sensors 3. From this, the light control circuit 5 may be configured such that, when it carries out luminance control upon image display, it carries out a mathematic operation process for obtaining one light intensity detection result from detection results of the light intensity at a plurality of points. As the mathematic operation process, derivation of an average value of the plural sensor outputs, derivation of an average value after one of a maximum value and a minimum value of the plural sensor outputs or both of the maximum value and the minimum value are truncated, derivation of an average value after a plurality of comparatively high values or a plurality of comparatively low values of the plural sensor outputs or both of the plural comparatively high values and the plural comparatively low values are truncated, or the like may be available. This is because, derivation of an average gives rise not only to enhancement of reliability of a result of detection by the fact that the center of gravity of the arrangement points of the light detection sensors 3 is within the image display region 2a but also to enhancement of reliability of a result of detection by the averaging of the sensitivity dispersions of the light detection sensors 3. Further, this is because, if the maximum value, the minimum value, the plural comparatively high values, the plural comparatively low values or the like are truncated, then a light amount variation which should not be picked up such as sudden light, shadow or the like at a certain point can be eliminated and this gives rise to enhancement of the reliability of a result of the detection. However, the mathematic operation process for obtaining one light intensity detection result from results of detection of the light intensity at a plurality of points is not necessarily required.

Figure 10:
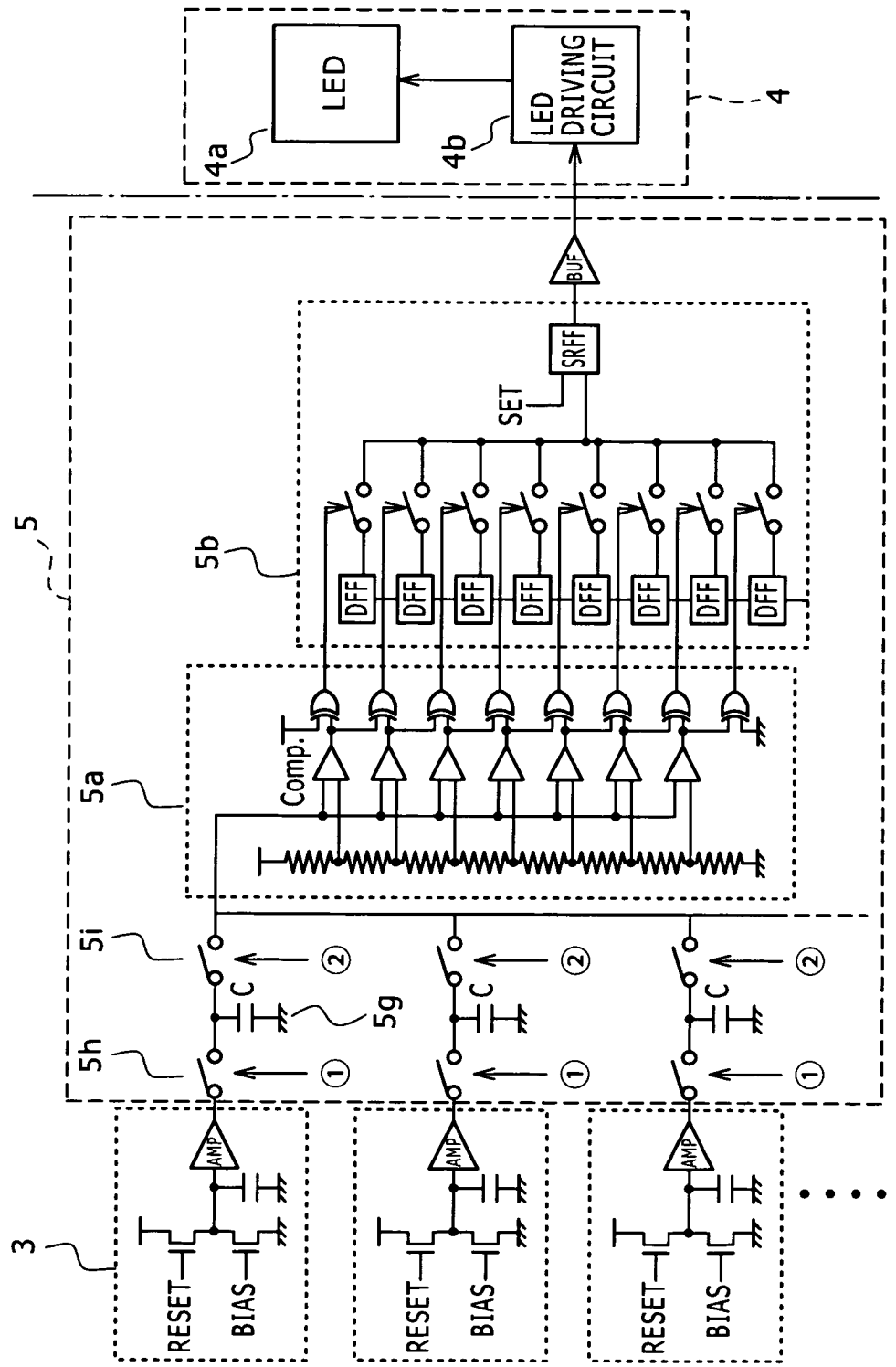
FIG. 10 is an explanatory view showing an example of a configuration of the light control circuit which carries out a mathematic operation process of deriving an average value from multi-point measurement results.

FIG. 10 is an explanatory view showing an example of a configuration of the light control circuit which carries out a mathematic operation process of deriving an average value from results of multiple-point measurement. The light control circuit 5 of the example shown in the figure includes two switches 5h and 5i disposed across a capacitor 5g in a corresponding relationship to light detection sensor 3 and is configured such that the switch 5h on the light detection sensor 3 side is closed to sample the sensor output of the capacitor 5g, whereafter the switch 5h is opened and the switch 5i is closed to average and output charge accumulated in the capacity of the capacitor 5g to the A/D converter 5a. If a mathematic operation process of deriving an average value of the sensor outputs is carried out by such a configuration as described above, then the necessity to prepare a number of A/D converters 5a equal to the number of the light detection sensors 3 is eliminated. Further, since a digital mathematic operation process is not carried out, high resolution AD conversion is not required, and it can be expected that this contributes to reduction in space, reduction in power consumption and so forth.

Figure 11:
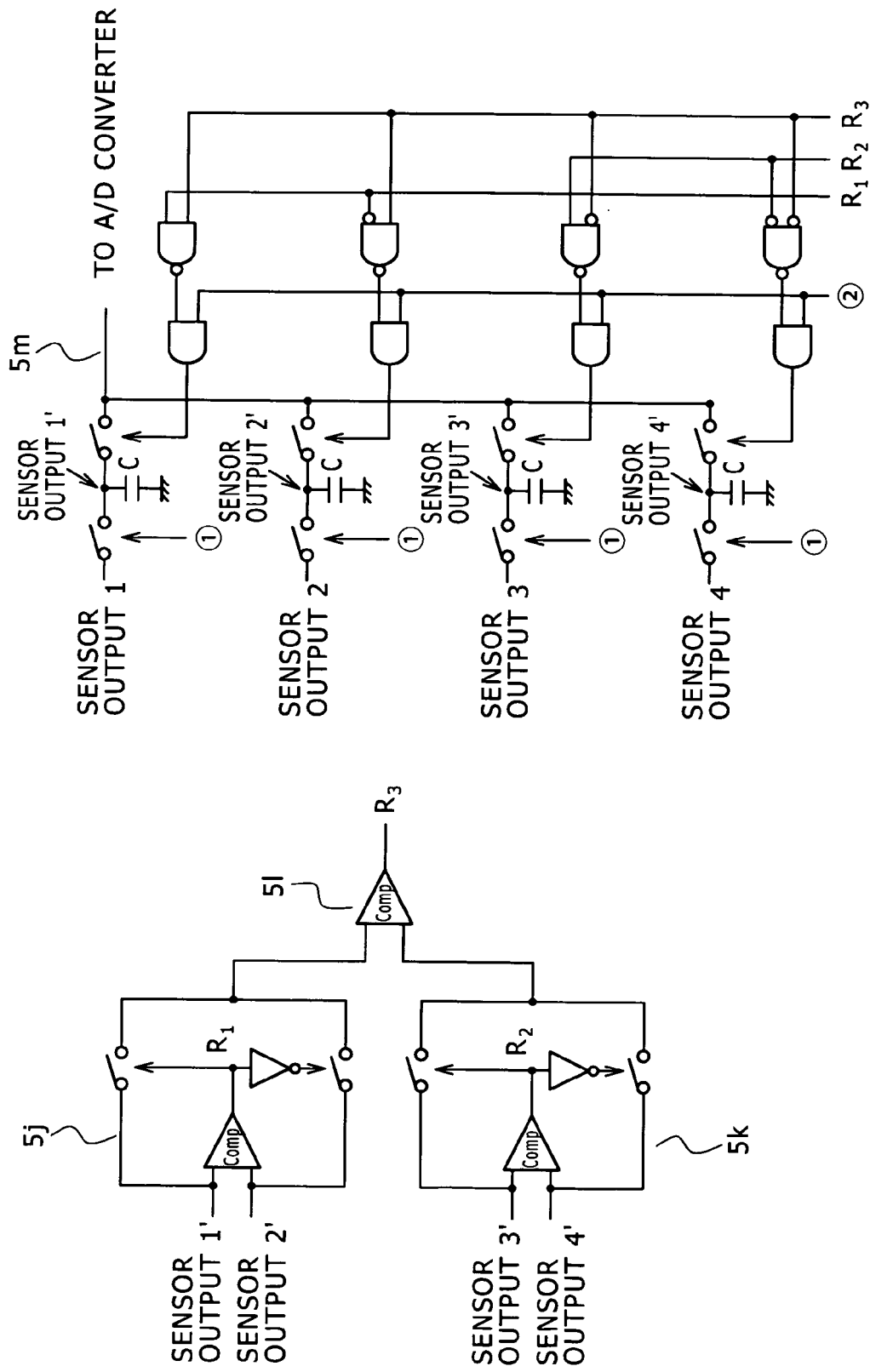
FIG. 11 is an explanatory view showing an example of a configuration of the light control circuit which carries out a mathematic operation process of deriving an average value by truncating a maximum value and so forth.

FIG. 11 is an explanatory view showing an example of a configuration of the light control circuit which carries out a mathematic operation process of deriving an average value by truncating a maximum value or the like. The light control circuit 5 of the example shown in the figure includes two switches 5h and 5i disposed across a capacitor 5g in a corresponding relationship to each light detection sensor 3 similarly as in the arrangement of FIG. 10, and is configured such that, after the switch 5h on the light detection sensor 3 side is closed to sample a sensor output into the capacitor 5g, the switch 5h is opened and the switch 5i is closed to average and output charge accumulated in the capacitance of each capacitor 5g to the A/D converter 5a. Further, the light control circuit 5 includes a comparison circuit 5j for comparing two of the plural sensor outputs to obtain a comparison result $R_1$, a comparison circuit 5k for comparing other two of the plural sensor outputs to obtain a comparison result $R_2$, a comparison circuit 5l for comparing the comparison result $R_1$ and the comparison result $R_2$ with each other to obtain a comparison result $R_3$, and an AND circuit 5m for being masked such that the highest sensor output is selected from such comparison results and only the selected switch is not opened. If the mathematic operation process including truncation of the maximum value is carried out by such a configuration as just described, then the maximum value or the like can be truncated to derive an average value without a digital arithmetic processing. It is to be noted that, even if not the maximum value but the minimum value, a plurality of comparatively high values, a plurality of comparatively low values or the like is truncated in the mathematic operation process, a similar configuration can be applied. Further, there is no necessity to prepare a number of A/D converters 5a equal to the number of light detection sensors 3, and since a digital mathematic operation process is not carried out, high-resolution AD conversion is not required and it is expected that the light control circuit 5 can contribute to reduction in space, reduction in power consumption and so forth.

It is to be noted that it is a possible idea to form the light control circuit 5 having such a configuration as described above on the same substrate with the display element section 2, that is, on the low-temperature polysilicon substrate similarly to the light detection sensor 3. This is because, if the light control circuit 5 is formed on the same substrate, then it becomes easy to cope with reduction in scale, reduction in space and so forth and this is preferable also from a point of view of enhancement of the efficiency of the fabrication process.

Now, processing operation of the display apparatus configured in such a manner as described above, particularly the luminance control upon image display, is described.

In the display apparatus with the configuration described above, when the display element section 2 displays an image, the light detection sensors 3 carry out detection of the light intensity. Then, after the light detection sensors 3 detect the light intensity, the light control circuit 5 controls the luminance when the display element section 2 displays an image based on a result of the detection. Accordingly, such a condition that, for example, where the light intensity is high, the luminance upon image display is increased, but where the light intensity is low, the luminance upon image display is suppressed can be implemented, and good image display can be carried out under various environments.

Besides, the detection of the light intensity on which the luminance control is based is carried out by the light detection sensors 3 formed on the same substrate as that of the display element section 2. In other words, there is no necessity to provide detection means such as a photo-sensor separate from and independent of the display element section 2. Accordingly, such a situation that the apparatus has an increased size for detection of the light intensity can be prevented, which makes the apparatus small in size, light in weight and superior in portability.

In short, according to the display apparatus having the configuration described above, while good image display may be displayed under various environments, even in this instance, increase in apparatus size can be prevented. Accordingly, the display apparatus is very preferable as a display apparatus for a mobile terminal apparatus which is small in size, light in weight and superior in portability.

Further, in the display apparatus having the configuration described above, the light detection sensor 3 is disposed at a plurality of points in the image display region 2a or in the proximity of the image display region 2a and detects the light intensity at the plural points. Such multiple-point measurement of the light intensity as just described can be implemented readily by forming the light detection sensors 3 on the same substrate as that of the display element section 2. Furthermore, to carry out multiple-point measurement of the light intensity has substantially the same significance as to carry out measurement regarding a region (image display region 2a) which lighting should be carried out actually, and this gives rise to enhancement of the reliability of a result of light intensity detection which luminance control is based on. Thus, if multiple-point measurement of the light intensity is carried out, then enhancement of the reliability, reduction in cost and reduction in space of the light adjustment system by luminance control can be implemented.

Further, in the display apparatus having the configuration described above, when luminance control when the display element section 2 displays an image is carried out based on a result of detection by the light detection sensor 3, the light control circuit 5 carries out a mathematic operation process for obtaining one light intensity detection result from results of detection of the light intensity at a plurality of points. Accordingly, since multiple-point measurement results are averaged, also the dispersions of the sensor sensitivity are averaged, and this gives rise to enhancement of the reliability of results of detection. Further, by truncating protruding data obtained by multiple-point measurement, a sudden light amount variation which should not originally be picked up can be eliminated. Also in this regard, enhancement of the reliability of results of detection can be achieved.

Incidentally, where the light detection sensors 3 carry out multiple-point measurement of the light intensity, the light control circuit 5 may carry out luminance control based on results of detection of multiple-point measurement uniformly over an overall area of the image display region 2a. However, also it is supposed that the luminance control may be carried out for each of a plurality of divisional regions into which the image display region 2a is divided.

Figure 12:
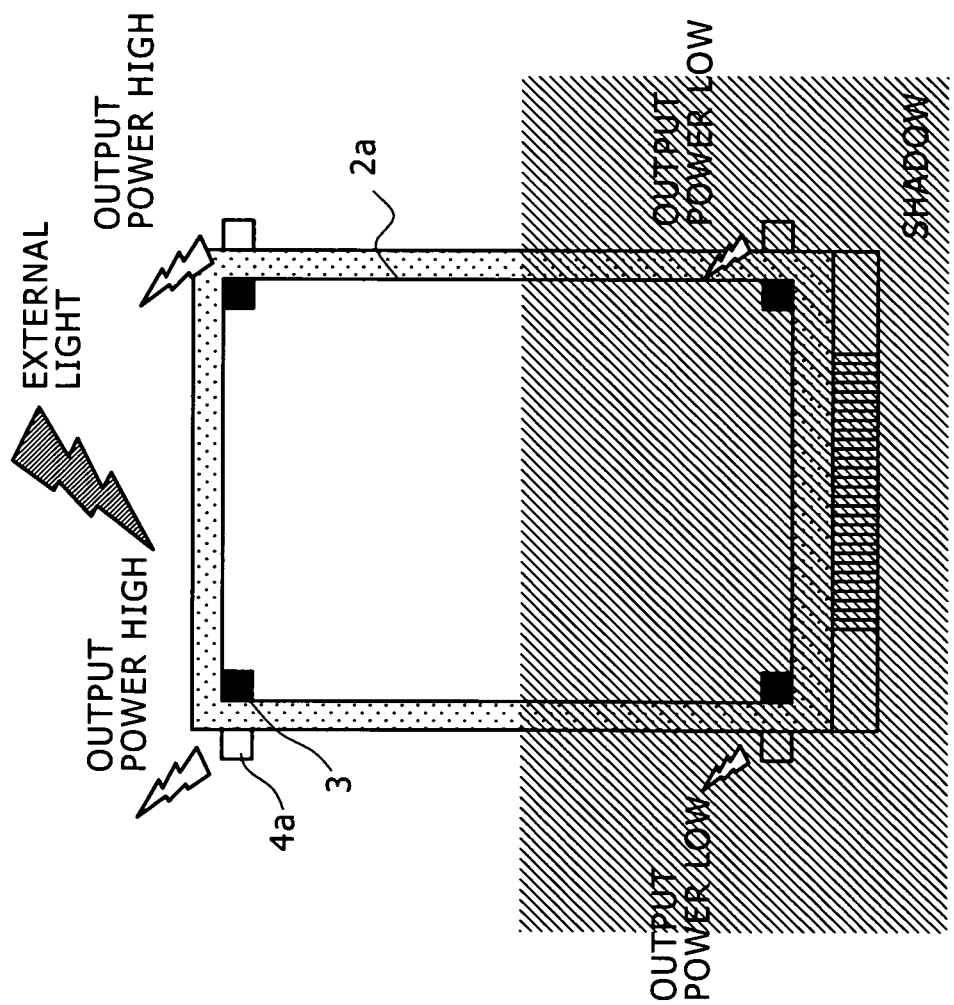
FIG. 12 is an explanatory view illustrating an outline of luminance control for individual divisional regions in the display apparatus according to the present invention.

FIG. 12 is an explanatory view illustrating an outline of luminance control for individual divisional regions. If use under various environments is supposed, then it may possibly occur that external light strikes on an upper side half region on the screen of the image display region 2a of the display apparatus while a lower side half region on the screen is covered with a shadow as in the case of the example of the figure. In such an instance as just described, if luminance control is carried out for the individual divisional regions, then it is possible, for example, to raise the luminance of the upper side half region of the screen while the luminance in the lower side half region of the screen is lowered. Thus, optimum luminance adjustment can be carried out under every environment.

Luminance control for the individual divisional regions may be carried out such that, in a case wherein the light source 4 is formed from a plurality of LEDs 4a and each of the LEDs 4a takes charge of light irradiation for each of the plural divisional regions, the positions of the individual divisional regions and the arrangement points of the plural LEDs 4a for irradiating the divisional regions and the plural light detection sensors 3 should be coordinated with each other in advance to control the luminance of each divisional region based on a result of detection of the light intensity at the corresponding point. In particular, light of an LED 4a for irradiating light on each divisional region is controlled such that, for a divisional region corresponding to the light detection sensor 3 at a point struck by external light, the luminance is raised, but for a divisional region corresponding to the light detection sensor 3 at another point covered with shadow, the luminance is lowered. It is to be noted that the number of light detection sensors 3 corresponding to one divisional region is not always one. In other words, a plurality of light detection sensors 3 may correspond to one divisional region, and in this instance, such a mathematic operation process as described hereinabove may be carried out for a result of detection by each light detection sensor 3. This similarly applies also to the LEDs 4a, and one LED 4a or a plurality of LEDs 4a may correspond to one divisional region.

Figure 13:
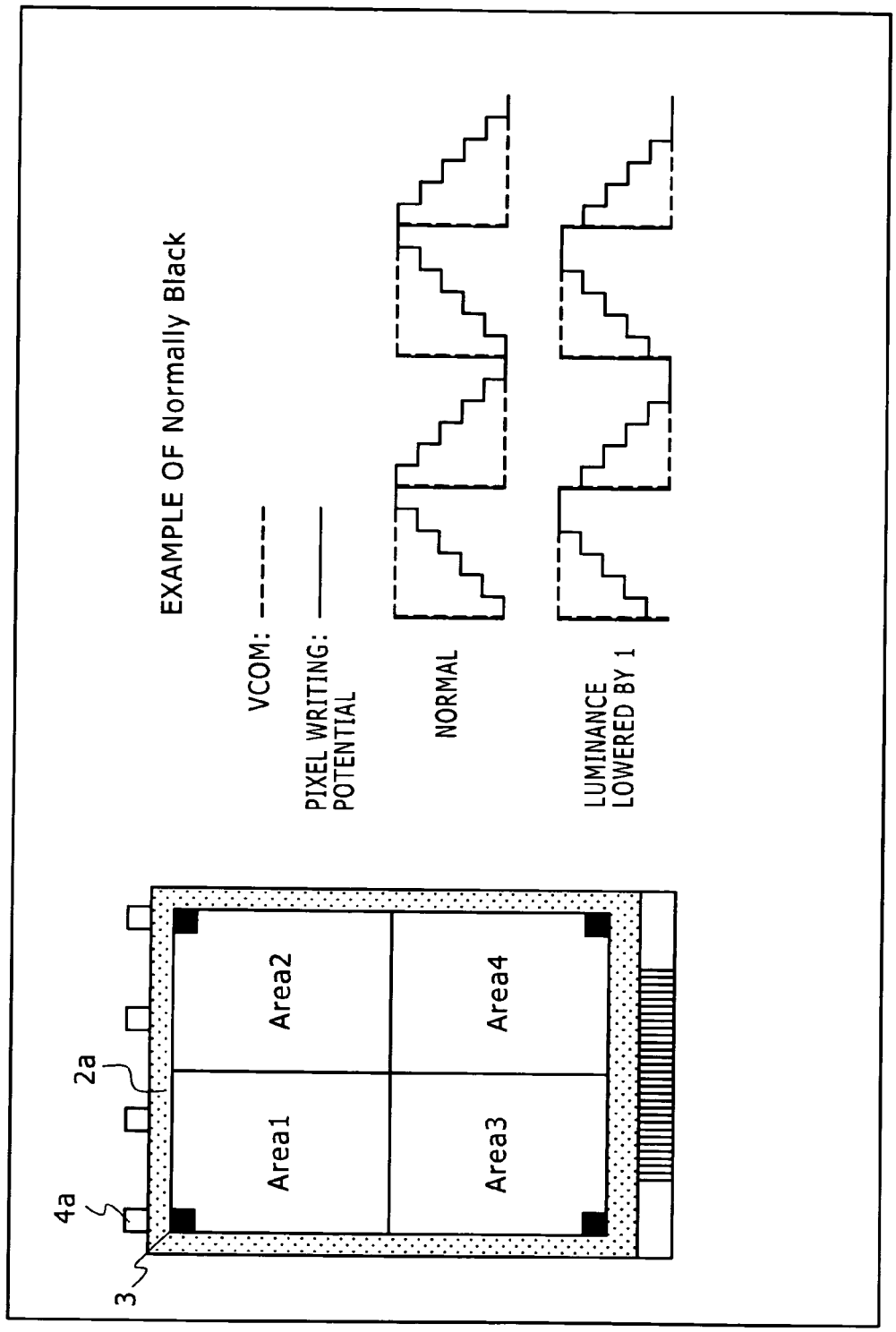
FIG. 13 is an explanatory view (part 1) illustrating another particular example of luminance control for individual divisional regions in the display apparatus according to the present invention.
Figure 14:
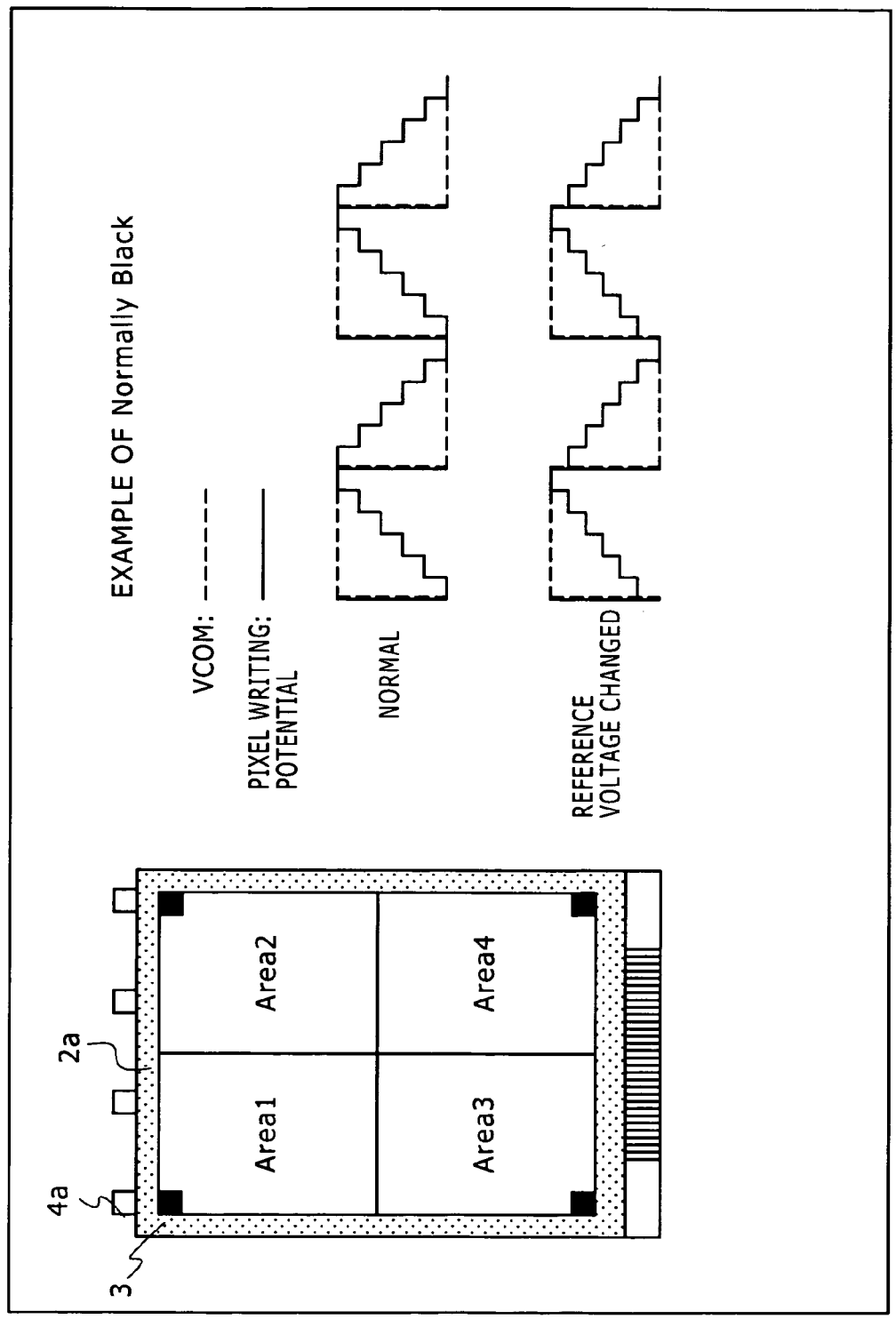
FIG. 14 is an explanatory view (part 2) illustrating a further particular example of luminance control for individual divisional regions in the display apparatus according to the present invention.
Figure 15:
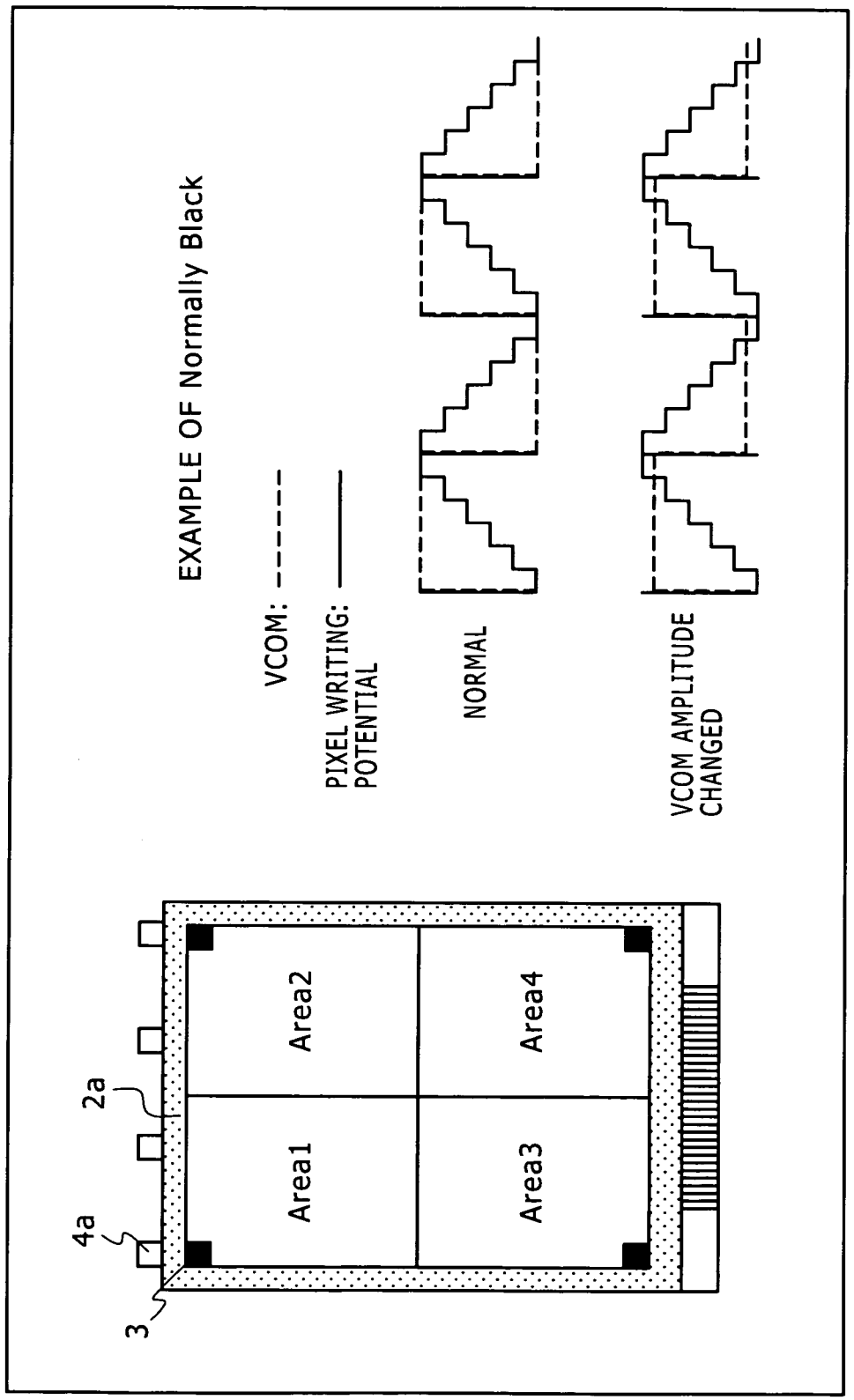
FIG. 15 is an explanatory view (part 3) illustrating a still further particular example of luminance control for individual divisional regions in the display apparatus according to the present invention.

Further, the luminance control for individual divisional regions can be carried out, even where the light source 4 is not formed from a plurality of LEDs 4a, by varying the transmission light amount of light from the light source 4 through the display element section 2 for the individual divisional regions. FIGS. 13 to 15 are explanatory views illustrating other particular examples of luminance control for individual divisional regions.

For example, if the light control circuit 5 carries out luminance control by transmission light amount variation and the transmission light amount variation is carried out by a digital mathematic operation process on image display data, as shown in FIG. 13, then detection results by the light detection sensor 3 regarding divisional regions Area1 to Area4 obtained by division into four regions are compared with each other, and if a difference greater than a predetermined threshold level is found, then the value of the image display data to those pixels belonging to the divisional region is lowered by "1" in order to lower the luminance of the divisional region of the high output. By this, a pixel writing potential waveform upon gradation display as in the case of the example of the figure is obtained. Consequently, the luminance control for the individual divisional regions can be carried out without the necessity for light control of the LEDs 4a for the individual divisional regions.

Further, for example, where the light control circuit 5 carries out luminance control by transmission light amount variation and the transmission light amount variation is carried out by reference voltage variation upon image display data writing, as seen in FIG. 14, detection results by the light detection sensor 3 regarding the individual divisional regions obtained by division into four regions are compared with each other, and where a difference greater than a predetermined threshold value is found, the reference voltage upon image display data writing into pixels which belong to the divisional region is varied by a predetermined amount in order to lower the luminance of the divisional region which has the high output power. By this, a pixel writing potential waveform upon gradation display as in the case illustrated in the figure is obtained, and luminance control for the individual divisional regions can be carried out without the necessity for light control of the LEDs 4a for the individual divisional regions.

Further, for example, if the light control circuit 5 carries out luminance control by transmission light amount variation and the transmission light amount variation is carried out by VCOM variation upon image display, then as shown in FIG. 15, results of detection by the light detection sensor 3 regarding the divisional regions Area1 to Area4 obtained by division into four regions are compared with each other, and if a difference greater than a predetermined threshold value is found, then the Hi potential of the VCOM to pixels belonging to the divisional region are lowered by a predetermined amount while the Low potential is raised by a predetermined amount in order to lower the luminance of the divisional region which has the higher output power. However, this is an example of a normally black (Normally Black) case, and the conditions are reversed in a normally white (Normally White) case. In either case, the VCOM is partitioned for each divisional region, and the divisional regions have VCOMs different from each other. Consequently, such a pixel writing potential waveform upon gradation display as in the example of the figure is obtained, and luminance control of the individual divisional regions can be carried out without the necessity for light adjustment of the LEDs 4a for the individual divisional regions.

It is to be noted that, while, in the present embodiment, a particular preferred example of the present invention is described, the present invention is not limited to the contents of the same, but the preferred example can be altered suitably without departing from the subject matter of the present invention.

For example, while, in the present embodiment, a case wherein the luminance upon image display is adjusted in response to the influence of external light detected by the light detection sensor 3, that is, a case wherein the light intensity of external light to the image display region is detected to carry out luminance adjustment for coping with any environment, is taken as an example, the light detection sensor 3 may detect the light intensity of light obtained from the image display region 2a. This is because, where the light detection sensor 3 detects light obtained from the image display region 2a, for example, it becomes possible to lower the brightness of an LED 4a corresponding to a divisional region in the proximity of a sensor whose output power is high but raise the brightness of another LED 4a corresponding to another divisional region in the proximity of another sensor whose output power is low, by this, a display apparatus having the light source 4 having luminance which is uniform in a plane can be configured. Further, even if the LEDs 4a cannot be controlled independently for the individual divisional regions, if the transmission factor of the display element section 2 in a divisional region in the proximity of a sensor whose output power is high is lowered, then a display apparatus having the display element section 2 which implements luminance uniform in a plane can be configured.

Figure 16:
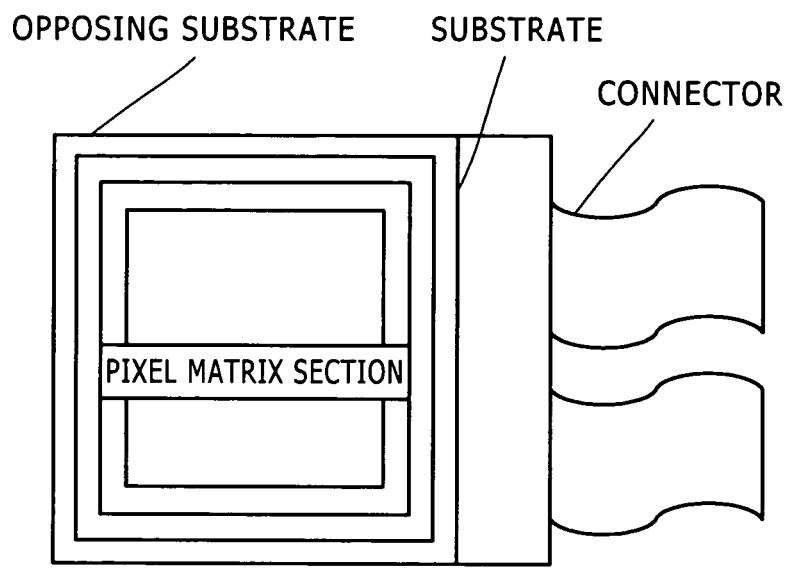
FIG. 16 is a plan view showing a module configuration of the display apparatus according to the present invention.

Further, the display apparatus of the present invention includes that of a flat type module shape as shown in FIG. 16. For example, the display apparatus is formed as a display module wherein a pixel array section wherein pixels, formed from a liquid crystal element, a thin film transistor, a thin film capacitor, a light reception element and so forth, are integrated and formed in a matrix on an insulating substrate and bonding agent is disposed in such a manner as to surround the pixel array section (display matrix section) to adhere an opposing substrate of glass or the like. On this transparent opposing substrate, a color filter, a protective film, a light blocking film and so forth may be provided as occasion demands. On the display module, for example, an FPC (flexible printed circuit) may be provided as a connector for inputting and outputting signals from the outside to the pixel array section and vice versa.

The display apparatus described above can be used with a display for electronic apparatus in all fields which has a flat panel shape and displays an image signal inputted to or produced in various electronic apparatus, for example, a digital camera, a notebook type personal computer, a portable telephone set and a video camera as an image or a picture.

In the following, electronic apparatus configured including such a display apparatus as described above, that is, particular examples of the electronic apparatus to which the present invention is applied, are described.

Figure 17:
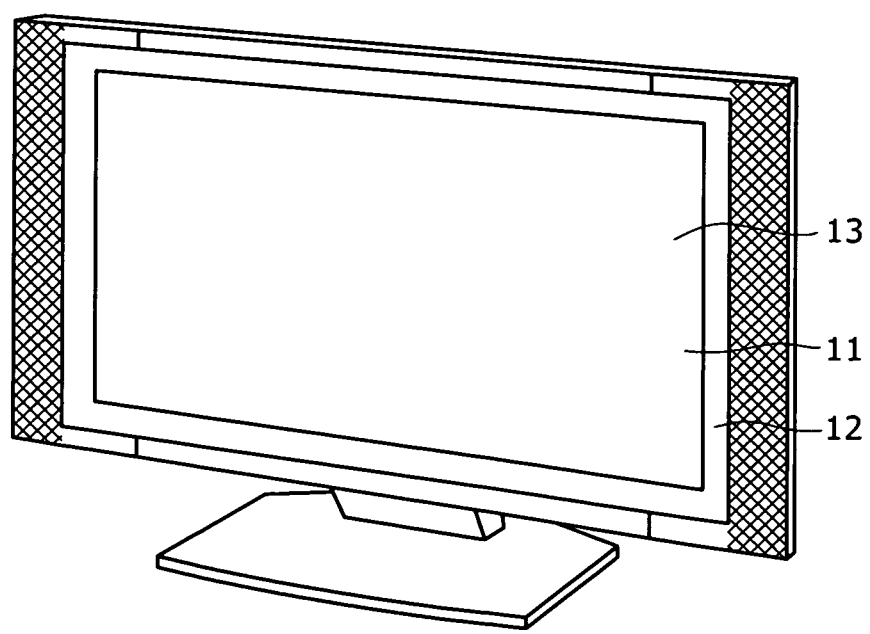
FIG. 17 is a perspective view showing a television set which includes the display apparatus according to the present invention.

FIG. 17 shows a television set to which the present invention is applied. The television set includes a front panel 12 and an image display screen 11 formed from a filter glass plate 13 and so forth and is produced using the display apparatus of the present invention as the image display screen 11.

Figure 18:
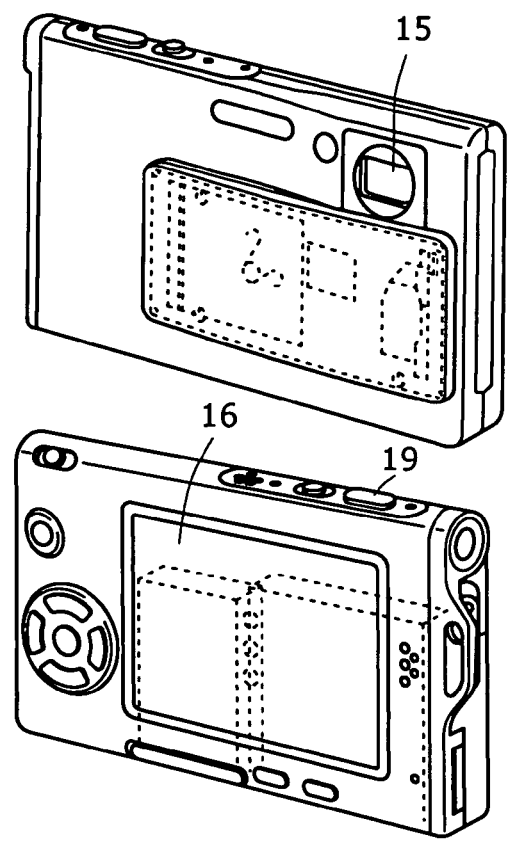
FIG. 18 is a perspective view showing a digital still camera which includes the display apparatus according to the present invention.

FIG. 18 shows a digital camera to which the present invention is applied, and an upper portion is a front elevational view and a lower portion is a rear elevational view. This digital camera includes an image pickup lens, a flash light emitting section 15, a display section 16, a control switch, a menu switch, a shutter 19 and so forth. The digital camera is produced using the display apparatus of the present invention as the display section 16.

Figure 19:
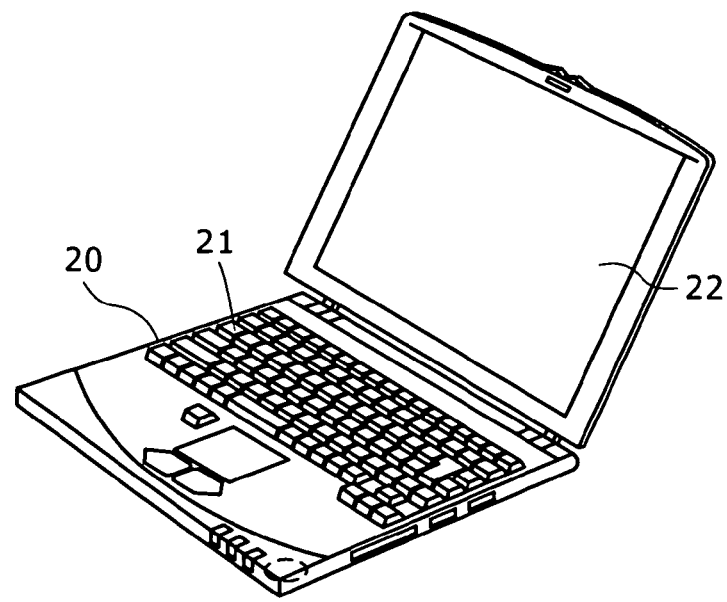
FIG. 19 is a perspective view showing a personal computer of the notebook type which includes the display apparatus according to the present invention.

FIG. 19 shows a notebook type personal computer to which the present invention is applied. A body 20 includes a keyboard 21 for being operated in order to input characters and so forth, and a body cover includes a display section 22 for displaying an image. The notebook type personal computer is produced using the display apparatus of the present invention as the display section 22.

Figure 20:
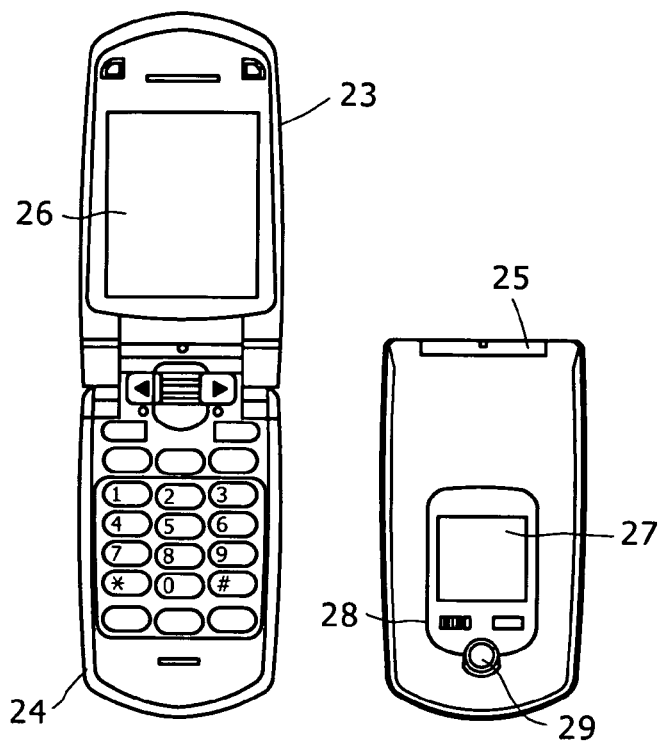
FIG. 20 is a schematic view showing a portable digital assistant which includes the display apparatus according to the present invention.

FIG. 20 shows a portable terminal apparatus to which the present invention is applied, and a left portion indicates an unfolded state while a right portion indicates a folded state. The portable terminal apparatus includes an upper side housing 23, a lower side housing 24, a connection section (here, a hinge section) 25, a display 26, a sub display 27, a picture light 28, a camera 29 and so forth. The portable terminal apparatus is produced using the display apparatus of the present invention as the display 26 or the sub display 27.

Figure 21:
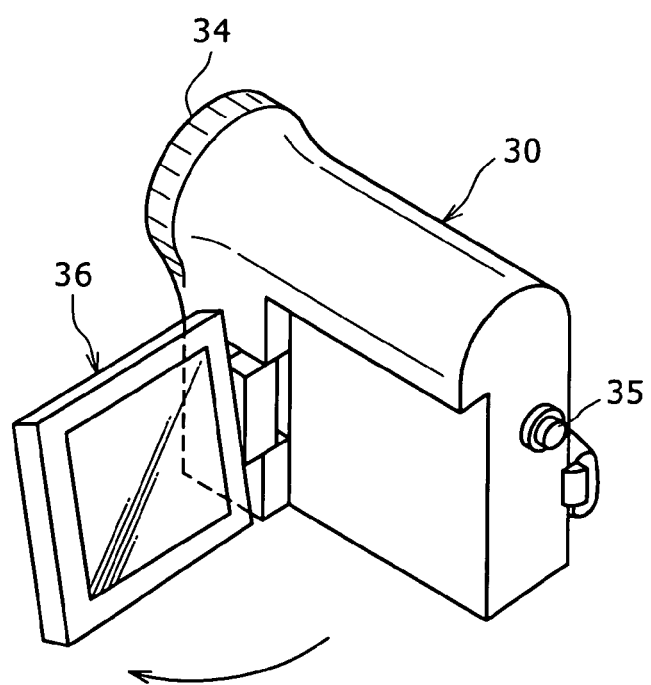
FIG. 21 is a perspective view showing a video camera which includes the display apparatus according to the present invention.

FIG. 21 shows a video camera to which the present invention is applied. The video camera includes a body section 30, and a lens 34 for picking up an image of an image pickup object, a start/stop switch 35 for image pickup, a monitor 36 and so forth provided on a side face which is directed forwardly. The video camera is produced using the display apparatus of the present invention as the monitor 36.

As described above, since the display apparatus according to the present invention and the electronic apparatus which includes the display apparatus and to which the present invention is applied are configured such that the luminance upon image display is controlled based on a result of detection of the light intensity, it is possible to carry out good image display under various environments. Besides, since the light intensity is detected using a thin film transistor formed on the same substrate as that of image display means, such a situation that the scale of the apparatus increases for detection of the light intensity can be prevented, and the display apparatus and the electronic apparatus are small in size, light in weight and superior in portability.

The invention claimed is:

1. A display apparatus, comprising:
an image display portion configured to display an image on an image display region;
a light detection portion configured to detect the intensity of light in said image display region or in the proximity of said image display region using a thin film transistor formed on a same substrate as that of said image display region; and
a light control portion configured to control the luminance when said image display portion displays an image based on a result of the detection by said light detection portion; wherein
a display element which is controlled by a voltage applied between electrodes is disposed in said image display region;
said light control portion adjusts the amplitude of an opposing electrode voltage to be applied to an opposing electrode opposing to one of the electrodes of said display element based on a result of the detection of said light detection portion;

said light detection portion is configured to respectively detect the intensity of light at a plurality of places in said image display region; and a mathematic operation portion is configured to carry out a mathematic operation process for obtaining one light intensity detection by averaging the result of the detection of the intensity of light at the plurality of places by said light detection portion.

2. The display apparatus according to claim 1, wherein said light control portion is capable of carrying out luminance control for individual divisional regions obtained by dividing said image display region into a plurality of portions and controls the luminance regarding the divisional regions based on the results of the detection of the light intensity at places corresponding to the divisional regions.

3. The display apparatus according to claim 1, further comprising light emission portion configured to serve as a light source for allowing said image display means to carry out the image display; wherein said light control portion is configured to vary the light emission intensity of said light emission portion along with the amplitude of the voltage to be applied to said opposing electrode to adjust the luminance when said image display portion displays an image.

4. The display apparatus according to claim 1, further comprising light emission portion configured to serve as a light source for allowing said image display portion to carry out the image display, said light control portion varying the transmission light amount of light from said light emission portion through said image display portion to adjust the luminance when said image display portion displays an image.

5. The display apparatus according to claim 1, wherein said light detection portion detects the light intensity of external light to said image display region.

6. The display apparatus according to claim 1, wherein said light detection portion is configured to detect the light intensity of light obtained from said image display region.

7. The display apparatus according to claim 1, wherein said light control portion is capable of carrying out amplitude control of the opposing electrode voltage for individual divisional regions obtained by dividing said image display region into a plurality of portions and adjusts the opposing electrode voltage for the divisional regions based on the results of the detection of the light intensity at places corresponding to the divisional regions.

8. An electronic apparatus comprising the display apparatus of claim 1.

9. The display apparatus according to claim 1, wherein said light detection portion is disposed at the plurality of places on the same substrate as said image display region.

10. The display apparatus according to claim 1, wherein said light detection portion is configured to detect the intensity of external light in the proximity of said image display region.

11. The display apparatus according to claim 1, wherein said light control portion is configured to control the luminance for each of a plurality of divisional regions in said image display region.

12. The display apparatus according to claim 11, wherein said plurality of divisional regions in said image display region are configured to form a matrix.

13. The display apparatus according to claim 1, wherein said light control portion is configured to control the luminance by varying an amount of light transmittance.

* * * * *